Aug. 25, 1953    J. F. RALEIGH    2,650,136
ATTACHMENT FOR SILO FILLING MACHINES
Filed March 7, 1951    2 Sheets-Sheet 1

INVENTOR
JOHN F. RALEIGH

BY
ATTORNEYS

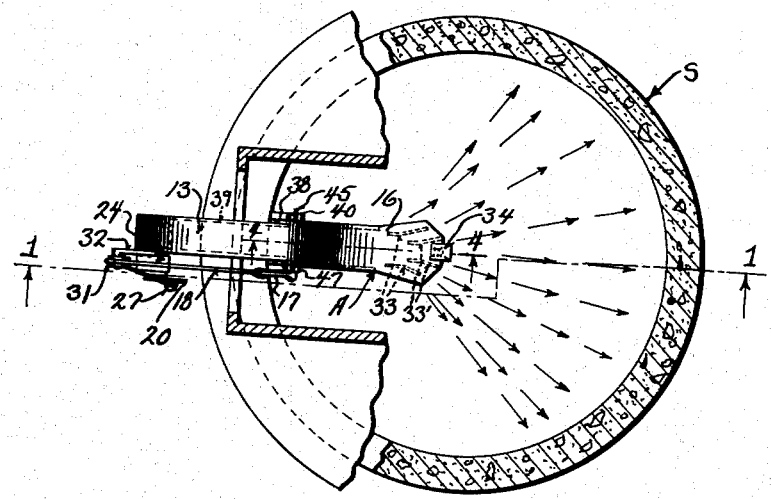
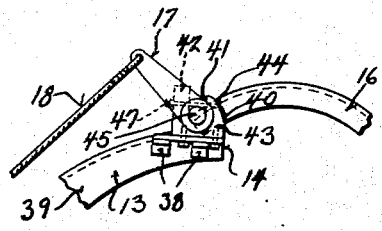
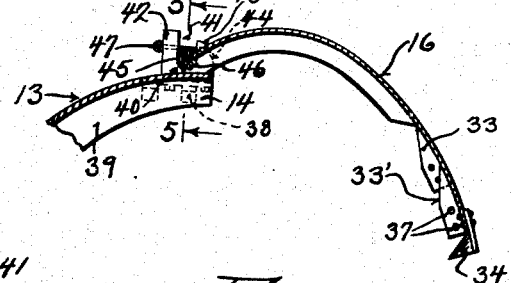
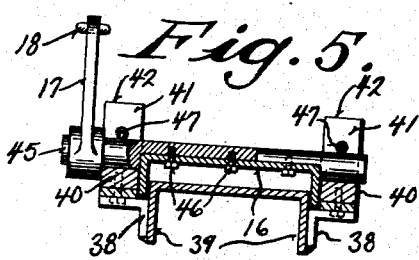
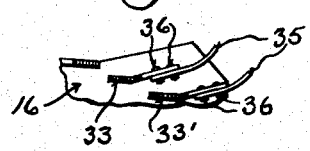
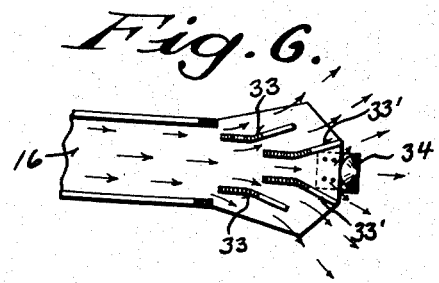

Patented Aug. 25, 1953

2,650,136

UNITED STATES PATENT OFFICE 2,650,136

ATTACHMENT FOR SILO FILLING MACHINES

John F. Raleigh, Peshtigo, Wis.

Application March 7, 1951, Serial No. 214,416

2 Claims. (Cl. 302—60)

This invention appertains to ensilage blowers and more particularly to a novel attachment for a silo filling machine.

In ensilage blowing machines, considerable difficulty is experienced during the operation thereof, due to the fact that the ensilage issuing from the exhaust end of the ensilage elbow is distributed unevenly and tends to pile up in the silo. Likewise, the finer material in the ensilage tends to separate from the heavier material, resulting not only in an uneven distribution of the material in the silo itself but also in an uneven distribution within the ensilage per se.

It is, therefore, a primary object of my invention to provide an attachment for a standard ensilage blower and silo filler which will distribute the ensilage evenly throughout the silo, and will prevent the separation of the fine material from the heavy material.

A salient feature of my invention is the provision of an attachment for ensilage and silo fillers embodying a deflector hood rockably mounted to the exhaust end of a conventional ensilage elbow, whereby the reciprocation of the deflector hood causes the ensilage to be effectively guided and evenly distributed in the silo.

A further object of my invention is to provide novel actuation means for imparting the reciprocating motion to the deflector hood.

A still further object of my invention is to provide the discharge end of the deflector hood with a guide finger and guide vanes which will deflect the ensilage to the outside walls of the silo.

Another object of my invention is to provide novel guide extensions for the guide vanes which may be utilized in the event a more positive control of the distribution of the ensilage is desired.

Another important object of my invention is the provision of means whereby my novel attachment can be readily and firmly secured in place to the blower by the ordinary layman, without necessitating the employing of skilled labor.

Still another object of my invention is to provide an ensilage blower attachment for an ensilage blower and silage filling machine, which will be durable and efficient in use, one that will be simple and easy to manufacture and one which can be placed upon the market at a reasonable cost.

With these and other objects in view, my invention consists in the novel construction arrangement and formation of parts as will be hereinafter more specifically set forth, claimed and illustrated in the accompanying drawings, in which Figure 1 is a side elevation illustrating the application of my attachment to a conventional ensilage blower, the view being of a diagrammatic nature and the section taken through the silo on the line 1—1, looking in the direction of the arrows, of Figure 2.

Figure 2 is a top plan view of the attachment, the section being taken through the silo on the line 2—2 of Figure 1, looking in the direction of the arrows.

Figure 3 is a fragmentary side elevation of the deflector hood and showing details of the attaching means for rockably securing the deflector hood to the exhaust end of the ensilage elbow.

Figure 4 is a longitudinal section through the deflector hood.

Figure 5 is a transverse section taken on the line 5—5 of Figure 4, looking in the direction of the arrows, and illustrating further details in the means for attaching the deflector hood to the exhaust end of the ensilage elbow.

Figure 6 is a fragmentary bottom plan view of the deflector hood, illustrating the arrangement of the guide finger and guide vanes.

Figure 7 is a fragmentary view similar to Figure 6, but showing only two of the guide vanes, and illustrating the guide extensions attached thereto.

Figure 1:
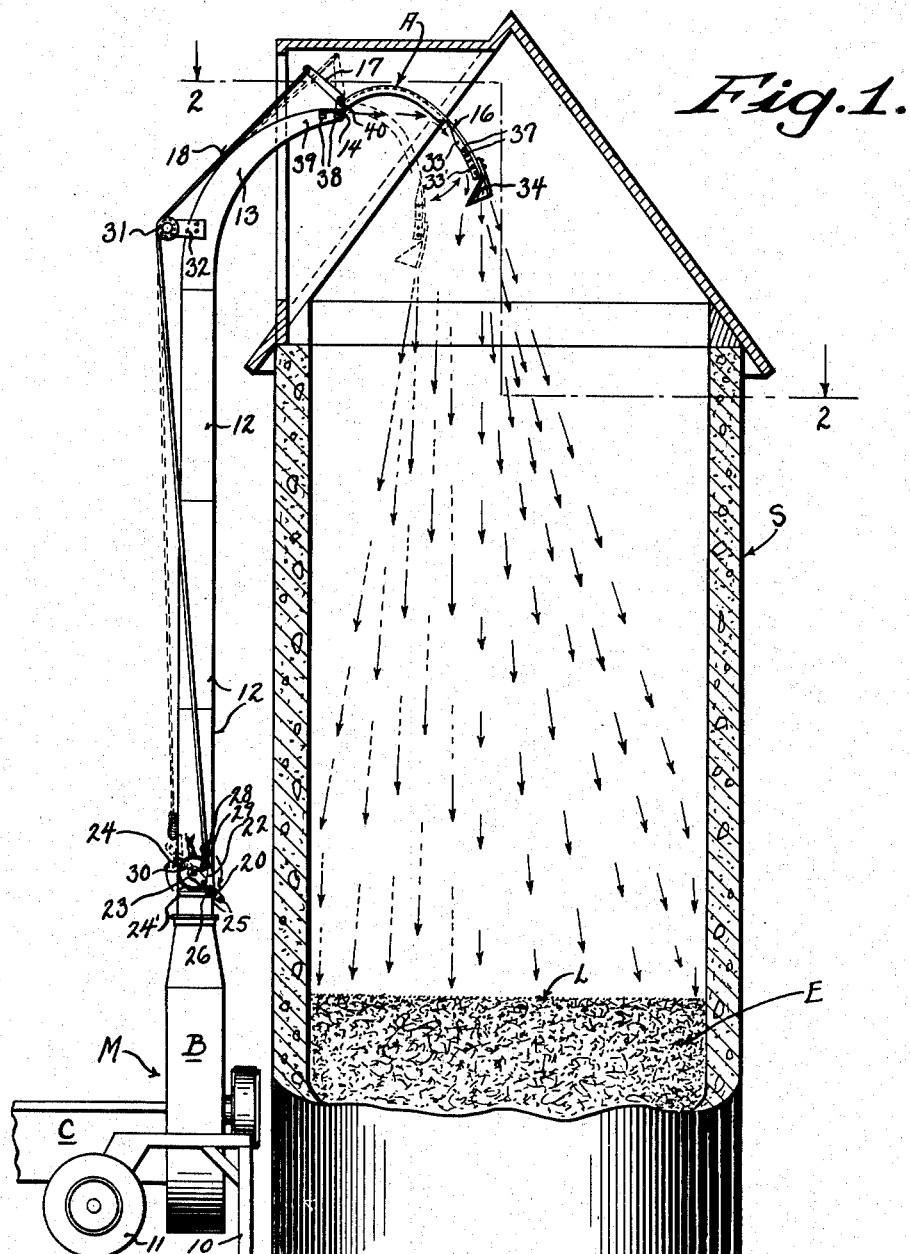

Referring to the drawings in detail, wherein similar reference characters designate corresponding parts throughout the several views, the letter A generally indicates my improved attachment for a silo filling machine M. The silo filling machine can be of any preferred or standard construction, and only a sufficient part of the silo filling machine has been illustrated to show the use of my improved attachment.

As illustrated in the drawings, the silo filling machine M includes a blower B and a longitudinally extending feed trough C which usually is provided with some sort of conveying means for feeding the ensilage to the blower B. The silo filling machine M is supported in its operative position by means of a supporting frame 10 and wheels 11. The blower B is formed with the usual blower pipe sections 12 and the standard ensilage elbow 13, through which the ensilage is blown and deposited in a conventional silo S.

In the usual operation of a silo filling machine

M, the ensilage elbow is extended into the silo opening and the ensilage is blown from the exhaust end 14 and deposited in the silo. This usually results in the piling up of the ensilage in the silo with an uneven distribution and uneconomical utilization of space. However, by utilizing my novel attachment A the ensilage is distributed evenly in the silo, thereby eliminating the above mentioned disadvantages.

Figure 8:
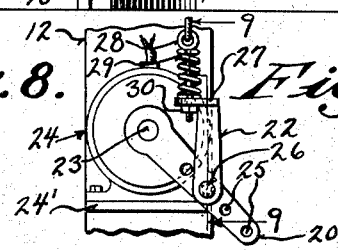
Figure 8 is a side elevational view illustrating the actuating means for imparting the reciprocating motion to the deflector hood.
Figure 9:
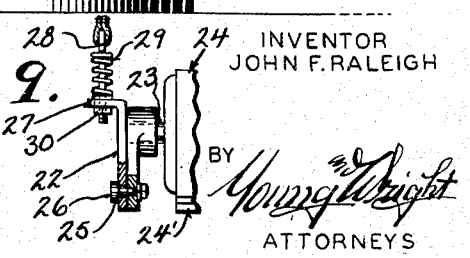
Figure 9 is a fragmentary front elevation, partly in section, of the actuating means, the section taken on the line 9—9 of Figure 8, looking in the direction of the arrows.

My attachment A includes broadly a deflector hood 16 which is rockably mounted to the exhaust end 14 of the ensilage elbow 13. Extending from a crank lever 17, which is rigidly splined to the deflector hood 16 for movement therewith, is a cable 18. The other end of the cable 18 is attached to a rotatably mounted crank arm 20 by means of a shorter crank arm 22. The crank arm 20 is splined to the rotatable shaft 23 of an electric motor 24. While it is obvious that any type of motor may be utilized to rotate the crank arm 20, in the preferred embodiment of my invention I provide a motor of the back-gear type. The motor 24 may be bolted to a bracket 24' which may be welded or otherwise secured to the blower B or any one of the blower pipe sections 12. The back gear type of motor is preferred because it rotates in a slow and extremely steady manner. The crank arm 20, as illustrated particularly in Figure 8, is provided with a series of apertures 25. Pivotally secured in one of the apertures 25, by means of a removable nut and bolt 26, is the shorter crank arm 22. The upper end of the shorter crank arm 22 has formed thereon a right angularly extending portion 27 to which the end of the cable 18 is adjustably fastened.

This adjustment of the cable 18 is due to the fact that the cable is fastened to the eye of a bolt 28, which in turn extends through a hole formed in the right angularly extending portion 27 of the crank arm 22. Interposed between the top surface of the portion 27 and the eye of the bolt 28 is a spring 29, and threaded to the under side of the portion 27 is a nut 30. It can be seen, therefore, that by tightening the nut 30, the bolt 28 will be pulled downwardly against the tension of the spring 29 and any slack in the cable 18 will be eliminated.

The cable 18 extends from the arm 22 over a pulley 31, which may be secured to a pipe section 12 or the ensilage elbow 13 by means of a bracket 32. The upper end of the cable 18 is fastened, as stated above, to the crank lever 17.

It should be apparent from the description thus far that when the back-gear motor is started, causing the rotation of the crank arms 20 and 22, that the deflector hood will be reciprocated from the full line position to the dotted line position as clearly shown in Figure 1 of the drawings. Therefore, ensilage issuing from the exhaust end 14 of the ensilage elbow 13 will be deflected and guided by the reciprocation of the arcuate shaped deflector hood and deposited in the silo S as indicated by the arrows. The ensilage, indicated by the letter E (Fig. 1), is deposited in an even straight line from the front to the rear of the silo as indicated by the letter L. However, it is also of the utmost importance that the ensilage E be distributed evenly to the right and left in the silo S, as indicated by the arrows in Figure 2 of the drawing. This is accomplished by providing the discharge end of the curved deflector hood 16 with a number of longitudinally extending guide vanes 33, 33' and a conically shaped depending guide finger 34.

The disposition of the guide finger 34 and guide vanes 33, 33' is clearly illustrated in either Figure 4 or 6 of the drawings, and it should be noted that the depending guide finger 34 is attached centrally of the discharge end of the deflector hood 16 between the diverging ends of the two center guide vanes 33'. The portion of the guide finger 34 which contacts the flowing ensilage is conically shaped so that (Figure 6) the ensilage may be deflected outwardly and downwardly as indicated by the arrows. It can now be seen that not only is the ensilage deposited evenly in a straight line from the front to the rear of the silo S, but, by means of the guide vanes 33, 33' and the guide finger 34, a part of the ensilage is guided and deflected outwardly to be deposited evenly to the right and left sides of the silo.

In utilizing the deflector hood 16 with certain types of ensilage, or with silos of larger diameters, it may be desirable to have a more positive and lengthened control of the material flowing from the discharge end, so when necessary, I provide extensions 35 which may be bolted to the guide vanes 33, 33' by nuts and bolts 36 extending through perforations 37 formed in the guide vanes 33, 33'.

In order to facilitate the easy attachment of my deflector hood 16 to the discharge end 14 of my standard ensilage elbow 13, I have provided a novel attachment means which is rigidly secured to the discharge end 14 by means of two L-shaped brackets 38. The brackets 38 are firmly attached to the sides 39 of the discharge end 14 by welding or any other suitable method. Bolted to the brackets 38 are a pair of identically formed bearing members 40. The bearing members 40 include a slot 41, an upwardly extending rear leg 42, and a shorter front leg 43. The front leg 43 has its forward and upper end curved slightly as indicated at 44 and illustrated in particular in Figures 3 and 4 of the drawings. Rockably received in the slots 41 is a pivot bar 45, to one end of which is rigidly splined the crank lever 17. The pivot bar 45 is provided with a longitudinal undercut portion intermediate its ends, to which is firmly bolted by means of bolts 46, the rear end of the deflector hood 16. The pivot bar 45 is held in its supporting bearings by means of cotter pins 47 which extend through the upright legs 42, 43 and over the top portion of the pivot bar 45. When it is desired to attach the deflector hood to the end 14 of the ensilage elbow 13, the pivot bar 45 is placed forwardly of the supporting bearings 40 and moved in a rearward direction. By means of the curved portion 44 of the front leg 43, the ends of the pivot bar 45 are conducted upwardly and into the slot 41. Thus it can be seen that the deflector hood may be easily attached by any ordinary layman without the employment of skilled help.

As described above, the reciprocation of the deflector hood 16 causes the ensilage E to be evenly deposited in the silo S in a straight and even manner as at L. However, as the level of the ensilage rises it is evident that the reciprocation of the deflector hood 16 must be increased in order that the material continue to be evenly distributed in the silo. This is accomplished by merely removing the bolt 26 from the crank arm 20 to one of the apertures 25 on the crank arm 20. By so doing, the outer end of the crank arm 20 reciprocating movement of the deflector hood 16 will be increased, and as the level of the ensilage approaches the top of the silo, the crank arm 22 may be secured to the extreme outer aperture 25 of the arm 20. It is also important to note that the shorter crank arm 22 should not be attached to the extreme outer aperture 25 of the crank arm 20 until the level of the ensilage E has approached the top of the silo. This is due to the fact that if the reciprocation of the deflector hood 16 is too great at the beginning of the silo filling, the ensilage will hit the sides of the silo intermediate its length, and bounce off and be deposited unevenly. The provision of the perforations 25 and the crank arm 20 also enables my novel attachment to be utilized with silos of varying diameters.

From the foregoing description, it can be seen that I have provided a novel attachment for standard silo filling machines which will effectively and evenly distribute the ensilage in the silo during the filling thereof, and is of such a character as to permit the same to be readily applied to a conventional ensilage blower by a layman.

Changes in details may be made without departing from the spirit or the scope of my invention, but what I claim as new is:

1. The combination with an ensilage blower including blower pipe sections and an ensilage elbow having an exhaust end extending into a silo, of an attachment for the ensilage blower adapted to evenly distribute the ensilage in the silo comprising, an arcuate shaped deflector hood pivotally secured at its rear end to the top portion of the exhaust end of the ensilage elbow, guide vanes extending longitudinally of and secured to the under surface of the deflector hood adjacent its discharge end, a conical guide finger depending centrally from the discharge end of the deflector hood intermediate the guide vanes, a crank lever rigidly fastened to the deflector hood adjacent its rear end and extending upwardly therefrom, a rotatable shaft secured to the ensilage blower at a point remote from the deflector hood and crank lever, a crank arm splined to said rotatable shaft, a cable fastened at one end to the outer extremity of the crank arm and at the other end to the outer extremity of the crank lever, and means including a motor adapted to impart rotation to the rotatable shaft, whereby the deflector hood will be reciprocated to guide and deflect the ensilage in the silo.

2. As a new article of manufacture, an attachment for silo filling machines and ensilage blowers comprising, a deflector hood, a pivot bar rigidly secured transversely to the rear end of the deflector hood, guide vanes extending longitudinally with and secured to the forward end of the deflector hood, a conical guide finger depending centrally from the discharge end of the deflector hood intermediate the guide vanes, a crank lever rigidly secured to one end of the pivot bar and extending at right angles thereto, a motor, a motor shaft, a crank arm rigidly secured to the motor shaft, a short crank arm adjustably and pivotally secured at one end to the motor crank arm, and a cable adjustably fastened at one end to the other end of the short crank arm and having its other end fastened to the crank lever.

JOHN F. RALEIGH.

References Cited in the file of this patent

UNITED STATES PATENTS

| Number | Name | Date |
|---|---|---|
| 2,257,572 | Radue | Sept. 30, 1941 |